(12) United States Patent
Schmidt et al.

(10) Patent No.: US 11,681,892 B2
(45) Date of Patent: Jun. 20, 2023

(54) METHOD FOR PRODUCING HOSELINES AND PIPELINES WITH RFID CHIPS

(71) Applicant: ContiTech USA, Inc., Fairlawn, OH (US)

(72) Inventors: Alexander Schmidt, Goettingen (DE); Carsten Wilke, Korbach (DE)

(73) Assignee: ContiTech USA, Inc., Fairlawn, OH (US)

( * ) Notice: Subject to any disclaimer, the term of this patent is extended or adjusted under 35 U.S.C. 154(b) by 21 days.

(21) Appl. No.: 17/302,659

(22) Filed: May 10, 2021

(65) Prior Publication Data
US 2021/0357720 A1 Nov. 18, 2021

(30) Foreign Application Priority Data
May 14, 2020 (DE) ............... 10 2020 206 092.4

(51) Int. Cl.
*G06K 19/077* (2006.01)
(52) U.S. Cl.
CPC ............... *G06K 19/07758* (2013.01)
(58) Field of Classification Search
CPC .............................. G06K 19/07758
USPC ................................................. 235/492
See application file for complete search history.

(56) References Cited

U.S. PATENT DOCUMENTS

| | | | |
|---|---|---|---|
| 9,038,670 B2 | 5/2015 | Vinoy | |
| 2008/0204235 A1 | 8/2008 | Cook | |
| 2016/0377232 A1* | 12/2016 | Boker | F16L 1/06 |
| | | | 709/217 |
| 2019/0195398 A1 | 6/2019 | Nüssen | |
| 2019/0276982 A1 | 9/2019 | Plaia | |
| 2020/0003931 A1* | 1/2020 | Dunn | G09F 19/22 |
| 2020/0371271 A1* | 11/2020 | Palomares | G06K 19/07766 |
| 2021/0312711 A1* | 10/2021 | Mahmoud | G06T 7/70 |
| 2022/0136922 A1* | 5/2022 | He | G01M 3/16 |
| | | | 73/40.5 R |
| 2022/0236115 A1* | 7/2022 | Tailor | G01K 1/14 |

FOREIGN PATENT DOCUMENTS

| | | |
|---|---|---|
| EP | 1884811 A1 | 2/2008 |
| EP | 2453264 A2 | 5/2012 |
| EP | 3284993 A1 | 2/2018 |
| WO | 2017210370 A1 | 12/2017 |

OTHER PUBLICATIONS

EP Search Report dated Oct. 18, 2021 of counterpart EP application 21171885.3 claiming the same priority application on which this application claimed priority.

* cited by examiner

*Primary Examiner* — Allyson N Trail

(57) ABSTRACT

A method for producing hoselines having at least the following working steps: a) providing a hoseline or pipeline blank (1, 2, 3) of at least one elastomeric and/or thermoplastic base material in a production device, while reinforcing elements may be embedded in the base material; and b) introducing an RFID structure (4, 4A, 4B, 4C) into the outer layer (3) of the hoseline or pipeline blank (1) in the axial direction parallel to the longitudinal axis of the hoseline or pipeline blank (1) and synchronously with the feed rate of the production device, the RFID structure having at least one carrier (4A) and the RFID structure (4, 4A, 4B, 4C) having RFID chips (4B) securely arranged on the carrier (4A) at predetermined spaced intervals.

20 Claims, 1 Drawing Sheet

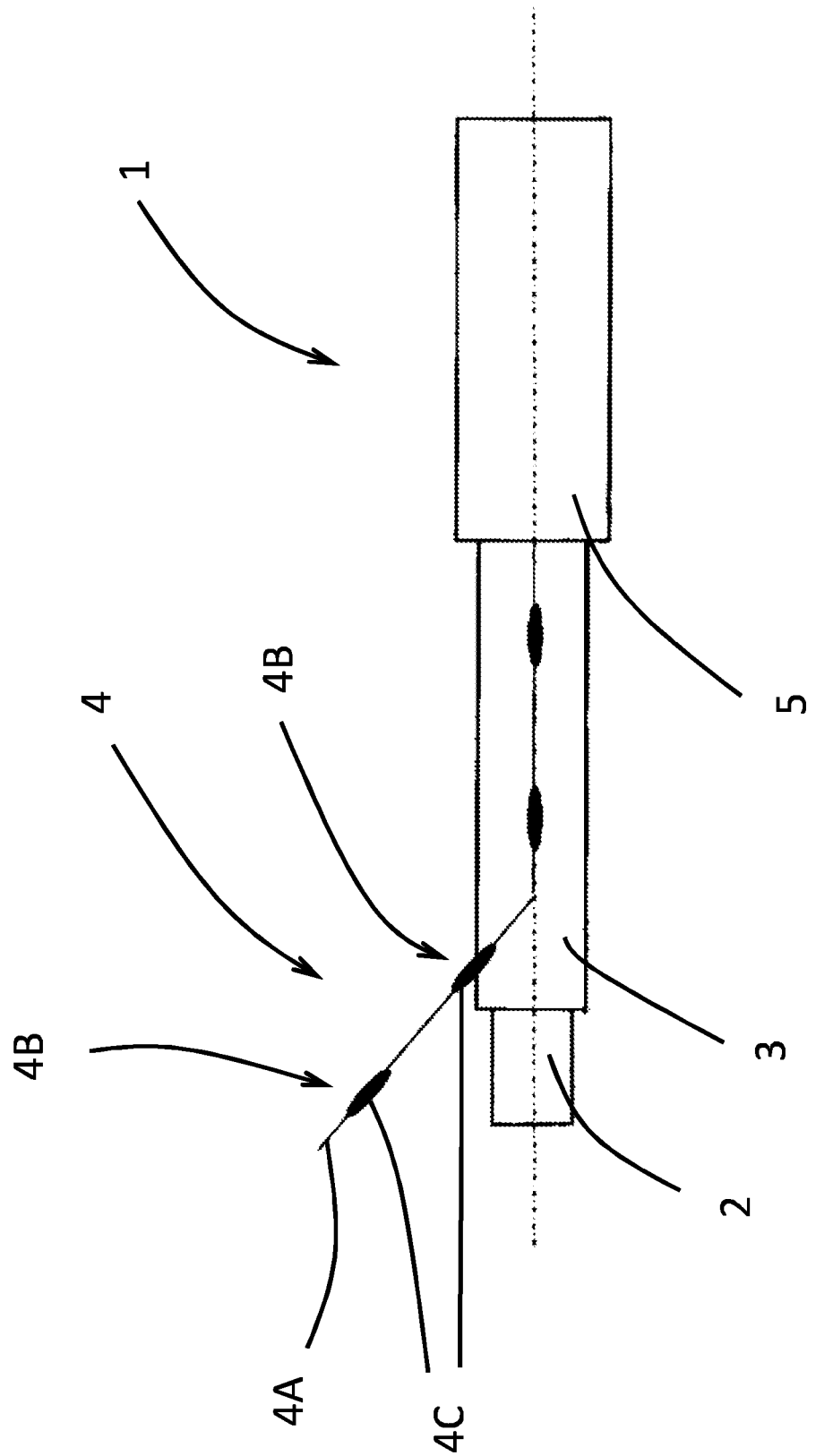

METHOD FOR PRODUCING HOSELINES AND PIPELINES WITH RFID CHIPS

The invention relates to a method for producing hoselines and pipelines with RFID chips.

Hoselines and pipelines are sometimes exposed to adverse environmental and operational conditions, which, in particular in the case of lines where safety is an issue, has the consequence that the hoselines and pipelines must be continuously monitored. If this is not possible for some reason, it is usual to set intervals at which the line is replaced by another in the course of preventive maintenance.

In both cases, it is necessary at least to identify the hoselines and pipelines and/or else to provide them with continuously operating sensors. RFID chips have become well-established in the past both for identification and for signal transmission from sensors, and are also used in the area of hoseline and pipeline technology.

Usually, RFID chips have antennas on a carrier material in the form of tags or strips. They can be subsequently secured on the outside of the hose. It is also known in the prior art that the RFID chips on a carrier material in strip form are wound around a plastic tube, or applied spirally, with a regular spacing from one another and with a defined pitch. U.S. Pat. No. 9,038,670 B2 discloses such a solution.

The subsequent mounting of the RFID chips on the outside of the hose requires additional effort. Further disadvantages are the risk of loss or damage, the lack of redundancy, the risk of injury and the possibility of contaminating deposits.

The widely used RFID chips on carrier material in the form of tags or strips are not suitable for being introduced into the hose during the hose production process. The form, format and type of construction result in adverse effects on the performance of the product, such as for example delamination of the layers, which may ultimately lead to failure of the hose.

US 2019/0 27 69 82 A1 proposes a solution in which a rope is provided with an RFID thread, the RFID thread having a filamentary carrier structure on which RFID chips are arranged at predetermined spaced intervals.

Such a filamentary structure can be embedded much better in an elastomer layer of a hose instead of a structure in the form of a strip. However, the aforementioned spiral winding on of the RFID threads requires a corresponding winding device, which in hoseline and pipeline production is often used for the various reinforcing layers in the lines and is therefore not available for other winding operations. Furthermore, in particular in the case of lines of relatively large diameters, winding on involves a high consumption of RFID threads.

The invention is based on the object of developing the known methods for embedding RFID chips in hoselines and pipelines in such a way that the embedding is possible without appreciably influencing the mechanical properties of the product and with low material consumption.

This object is achieved by the method having at least the following working steps, specifically:
a) providing a hoseline or pipeline blank of at least one elastomeric and/or thermoplastic base material in a production device, while reinforcing elements may be embedded in the base material,
b) introducing an RFID structure into the outer layer of the hoseline or pipeline blank in the axial direction parallel to the longitudinal axis of the hoseline or pipeline blank and synchronously with the feed rate of the production device,
the RFID structure having at least one carrier and the RFID structure having RFID chips securely arranged on the carrier at predetermined spaced intervals.

In a development of the invention, the RFID chips have in each case at least one antenna, which are respectively connected in an electrically conducting manner to the RFID chips at the front and/or rear in the longitudinal direction of the carrier.

In a development of the invention, the carrier is made up of one or more yarns.

In a development of the invention, the antennas are twisted with the carrier.

By being twisted with the carrier, the antennas are well protected from damage.

In a development of the invention, the carrier is formed in an electrically conducting manner.

In a development of the invention, the antennas of the RFID chips are formed by the carrier.

If the carrier is formed in an electrically conducting manner, for example by a metallic yarn, separate antennas are not required, since the carrier can also assume this task.

Introducing the RFID carrier into the hoseline or pipeline blank parallel to the longitudinal axis has the advantage that no winding unit is required. For example, already during the extrusion of an inner or intermediate layer, the RFID structure may as it were run along with it at the feed rate, it being pulled along in the feeding direction by the hoseline or pipeline blank. As a result, even in cases of different dimensions, a constant distance between the tags is always ensured if the distance between the tags on the carrier material remains the same. Furthermore, dispensing with the turns allows the consumption of RFID structures to be reduced significantly.

In a development of the invention, the RFID chips are protected by a protective enclosure.

The protective enclosure protects the RFID chips from environmental influences before and during processing.

In a development of the invention, the method has at least the following further working steps, specifically:
c) applying a further layer to the hoseline or pipeline blank in such a way that the RFID structure is covered by the further layer.

The further layer of the hoseline or pipeline blank protects the RFID structure from external influences.

By means of final vulcanization, the RFID structure is securely embedded in the wall of the then finished hoseline or pipeline.

With the aid of the invention, identification of the hoses is possible, for example for compiling an inventory in the sense of recording and managing hoses for stockkeeping purposes. Furthermore, this allows the possibility of ascertaining the specific location of hoses or pipelines. Furthermore, in the case of assembly, the IDs of a hose or pipe can be combined with IDs of the add-on parts, such as fittings. On the basis of a unique ID, the articles can be traced.

In addition, RFID chips can be combined with sensors. This allows operating parameters to be monitored, lifetime predictions to be made and failures to be identified. This ultimately has the result that downtimes are reduced to a minimum.

The method according to the invention makes particularly simple production of such hoses possible.

An example of the invention is explained in more detail below on the basis of the drawing.

FIG. 1 shows a basic representation of a hoseline 1. The hoseline 1 has an internal structure 2, which comprises one or more layers in a way that is not shown any more specifically here. Applied to an intermediate layer 3 is an RFID structure 4, which lies on or is pressed into the intermediate layer 3 parallel to the longitudinal axis 5 of the hoseline 1.

The RFID structure 4 has a carrier 4A and RFID chips 4B, the RFID chips 4B being arranged on the carrier 4A such that they are spaced apart from one another by a predetermined amount along the carrier 4A and being surrounded in a way not shown any more specifically by a protective enclosure 4C. The RFID chips 4B have antennas not shown here, which are twisted in the carrier 4A and lie before and after the respective RFID chips 4B in the direction of the carrier and are connected in an electrically conducting manner to the enclosed RFID chips 4B.

The hoseline 1 also has an outer layer 5, which is extruded on the underlying hose blank structure 2, 3, 4 and protects the RFID structure 4 from external influences before and after vulcanization to form a finished hoseline.

LIST OF REFERENCE SIGNS

Part of the Description

1 Hoseline
2 Internal structure of the hoseline 1
3 Intermediate layer
4 RFID structure
4A Carrier of the RFID structure 4
4B RFID chips on the carrier 4A
4C Protective enclosure of the RFID chips 4B
5 Outer layer

We claim:

1. A method for producing hoselines with RFID chips, wherein the method comprises the steps of:
    a) providing a hoseline blank of at least one elastomeric and/or thermoplastic base material in a production device, while reinforcing elements may be embedded in the base material; and,
    b) attaching an RFID structure on the hoseline blank in an axial direction parallel to a longitudinal axis of the hoseline blank and synchronously with a feed rate of the production device;
wherein the RFID structure has at least one carrier; and,
wherein the RFID structure comprises RFID chips securely arranged on the carrier at predetermined spaced intervals.

2. The method according to claim 1, wherein the RFID chips have in each case at least one antenna, which are respectively connected in an electrically conducting manner to the RFID chips at the front and/or rear in a longitudinal direction of the RFID structure.

3. The method according to claim 1, wherein the carrier comprises one or more yarns.

4. The method according to claim 3, wherein the antennas are twisted with the carrier.

5. The method according to claim 3, wherein the carrier is formed in an electrically conducting manner.

6. The method according to claim 5, wherein the antennas of the RFID chips are formed by the carrier.

7. The method according to claim 1, wherein the RFID chips are protected by a protective enclosure.

8. The method according to claim 1 further comprising:
    c) applying a further layer to the hoseline blank in such a way that the RFID structure is covered by the further layer.

9. The method according to claim 1 further comprising extruding an outer layer onto the hose blank structure.

10. The method according to claim 1 further comprising a final vulcanization step, after which the RFID structure is securely embedded in the wall of the then finished hoseline.

11. A method for producing pipelines with RFID chips, wherein the method comprises the steps of:
    a) providing a pipeline blank of at least one elastomeric and/or thermoplastic base material in a production device, while reinforcing elements may be embedded in the base material; and,
    b) attaching an RFID structure on the pipeline blank in an axial direction parallel to a longitudinal axis of the pipeline blank and synchronously with a feed rate of the production device;
wherein the RFID structure has at least one carrier; and,
wherein the RFID structure comprises RFID chips securely arranged on the carrier at predetermined spaced intervals.

12. The method according to claim 11, wherein the RFID chips have in each case at least one antenna, which are respectively connected in an electrically conducting manner to the RFID chips at the front and/or rear in a longitudinal direction of the RFID structure.

13. The method according to claim 11, wherein the carrier comprises one or more yarns.

14. The method according to claim 13, wherein the antennas are twisted with the carrier.

15. The method according to claim 13, wherein the carrier is formed in an electrically conducting manner.

16. The method according to claim 15, wherein the antennas of the RFID chips are formed by the carrier.

17. The method according to claim 11, wherein the RFID chips are protected by a protective enclosure.

18. The method according to claim 11 further comprising:
    c) applying a further layer to the pipeline blank in such a way that the RFID structure is covered by the further layer.

19. The method according to claim 11 further comprising a final vulcanization step, after which the RFID structure is securely embedded in the wall of the pipeline.

20. The method according to claim 19 further comprising ascertaining a specific location of the finished pipeline.

* * * * *